Patented Jan. 16, 1940

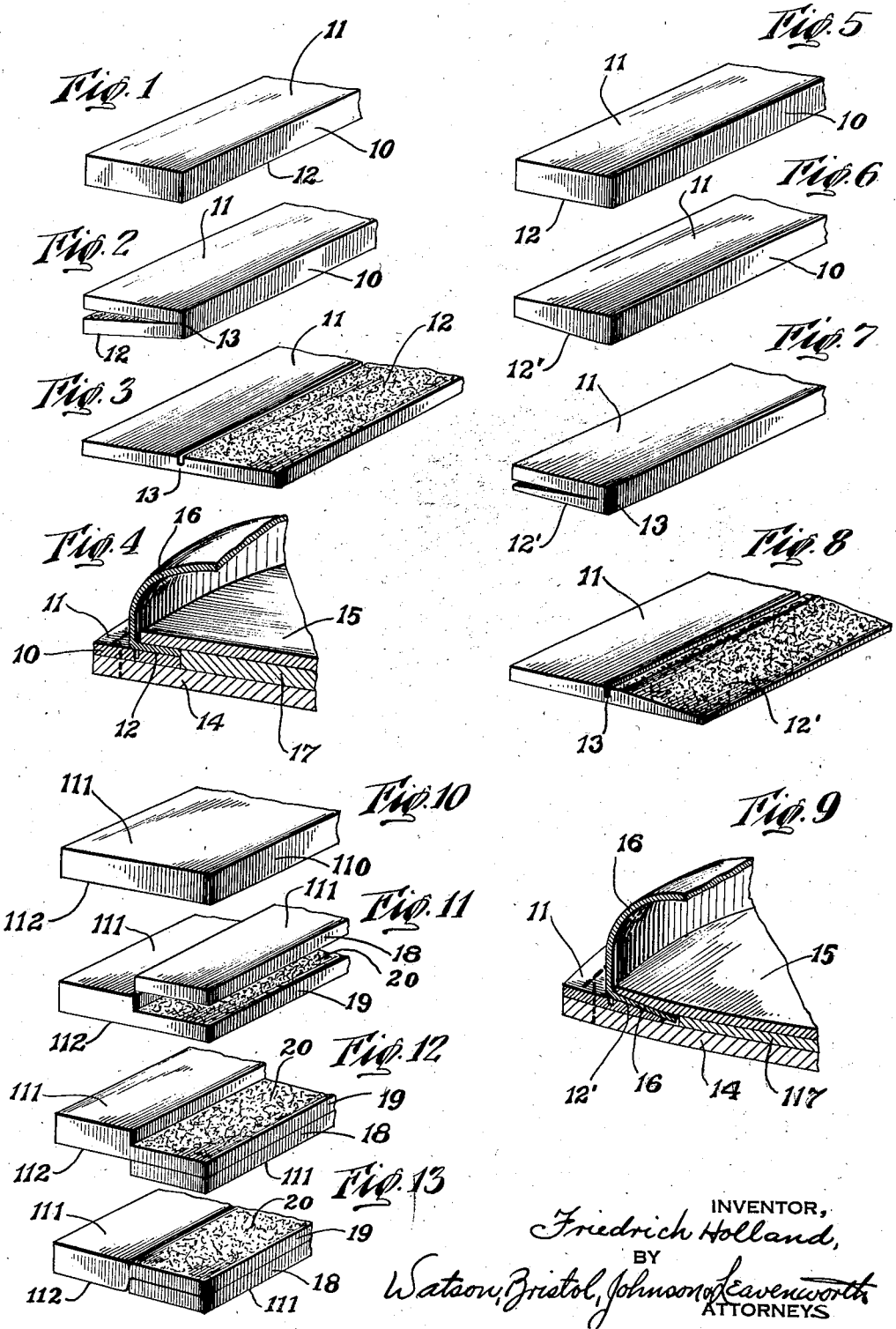

2,187,031

UNITED STATES PATENT OFFICE 2,187,031

WELTED FOOTWEAR

Friedrich Holland, Brockton, Mass., assignor to Compo Shoe Machinery Corporation, Boston, Mass., a corporation of Delaware Application October 20, 1936, Serial No. 106,529

2 Claims. (Cl. 12—146)

This invention relates to the manufacture of welted shoes, and more particularly to shoes having a novel form of cementable welting.

General objects of the invention are to provide novel welts adapted for cement affixation to a lasted shoe, together with novel methods of making such welts.

More particularly, objects of the invention are to provide a leather welt and a method of making it having a grain surface and another cementable surface, which may be the flesh surface of the leather stock, with such cementable surface forming an inward extension from the grain surface, and in which the welt stock is economically utilized without waste.

Further objects are to provide an improved welted shoe construction and a method of making it.

Other objects of the invention will in part be obvious and will in part appear hereinafter.

Since certain changes in carrying out the above process, and certain modifications in the article which embody the invention may be made without departing from its scope, it is intended that all matter contained in the above description shall be interpreted as illustrative and not in a limiting sense.

For a fuller understanding of the nature and objects of the invention reference should be had to the following detailed description taken in connection with the accompanying drawing, in which:

Fig. 1 is a fragmentary perspective view of a strip of welt stock adapted to be used in the making of welts embodying principles of the invention.

Fig. 2 is a fragmentary perspective view showing a step in the formation of such a welt, Fig. 3 is a fragmentary perspective view showing the finished cementable welt, Fig. 4 is a fragmentary sectional view across the forepart of a shoe constructed with the welt of Fig. 3, Fig. 5 is a fragmentary perspective view of a strip of welt stock useful in making another form of cementable welt, Fig. 6 is a fragmentary perspective view of a welting of Fig. 5 showing its underside beveled, Fig. 7 is a fragmentary perspective view of the welting of Fig. 6 showing a further step, Fig. 8 is a fragmentary perspective view of a completed welt made from the stock shown in Fig. 5, Fig. 9 is a fragmentary perspective view across the forepart of a shoe made with the welt of Fig. 8, and Figs. 10, 11, 12 and 13 are fragmentary perspective views showing steps in the manufacture of another form of cementable welt.

In accordance with one method of manufacturing shoes, a welt is provided on its upper side with a cementable surface in addition to the usual grain surface. This welt is attached around the margin of an outsole, usually by stitching, and the shoe bottom thus formed is then stuck to the bottom of a lasted upper by means of cement applied to such cementable welt surface.

Since a grain surface cannot be readily cemented, it has been necessary to attach some cementable material such as fabric to the welt, or else to remove the grain by deep roughing, by cutting away the grain, or other methods which are wasteful of the welt material and require comparatively expensive welt stock.

On the other hand, the flesh surface of a grain leather welt strip is often rather loose fibered and ready for the reception of cement in its natural condition, or can readily be made so by a light roughing operation. In accordince with a preferred form of this invention such cementable flesh side of the welt strip is reallocated as an inward extension or continuation of the grain surface to provide a suitable cementing area along the inner margin of the upper side of the ultimately formed welt, while utilizing all of the original welt stock and requiring a narrower width of stock material.

Referring more particularly to the drawing, there is shown in Fig. 1 a welt strip 10 which may be of indefinite length, which preferably is of grain leather welt stock having an upper grain side 11 and a lower flesh side 12. This stock may be substantially rectangular in cross section and is preferably about twice as thick as a conventional welt. If the flesh side 12 is not already in suitable condition for the reception of a permanent cement such as pyroxlin or the like, it may be conveniently roughed at this time. This welt stock is next split horizontally about midway of its thickness from its outer edge nearly but not entirely to its inner edge, thus separating the grain side from the flesh side except along the attached edge at 13.

The under or flesh side of the welt strip is then folded about its attached edge at 13, as shown in Fig. 3, until its flesh surface 12 faces in the same direction as the grain surface. When the two parts divided by the slit are approximately the same thickness along the inner edge of the welt the flesh surface 12 will be substantially flush with the grain surface and will in effect form an inward continuation thereof. The completed welt thus formed has both its grain and flesh surfaces on the same side, and on the other side has split surfaces which are also suitable for cementing, if desired, or may readily be made so by roughing.

In making a shoe by means of the welting shown in Fig. 3, an outsole 14 has a strip of welting attached around its margin with the grain surface of such welting facing upwardly and extending inwardly with respect to the grain surface. The outer grain portion of the welt may be stitch attached to the outsole as illustrated or the under side of the welt may be cemented to the outsole by means of a permanent cement such as pyroxide. If desired the flesh surface 12 may be roughed after the folding operation, or after attachment of the welt to the outsole. A lasted upper comprising an insole 15 having an upper 16 lasted thereto in any suitable manner, but preferably with its overturned lasting allowance lying flat against the bottom of the insole, is provided. The lasting allowance may be attached to the insole by cement, staples, stitching, or any other desired fastening means. A filler 17 which is preferably in the form of a single dinked out piece of composition or the like may be positioned on the upper side of the outsole within the inner edges of the welt and lasting allowance, or such filler may be applied to the bottom of the lasted upper prior to assembly with the outsole. The overturned lasting allowance is suitably roughed and coated with cement, and the flesh surface 12 of the welt is similarly coated with cement and roughed when needed. The bottom of the lasted upper is then pressed against the cemented surface 12 of the welt in any suitable sole affixing press and the parts kept under pressure until a permanent bond is effected. Pyroxlin cement is preferred for affixing the lasted upper to the welt, but any other suitable permanent cement may be employed. The cement may be allowed to dry on the welt and shoe bottom, and later activated with a suitable solvent, or it may be applied just before pressing.

In Figs. 5 to 8 another form of welt construction is illustrated. Here a welt strip 10 having a grain surface 11 and a flash surface 12 is provided. This may be substantially the same as the strip shown in Fig. 1. This strip is then tapered along its flesh surface so that its inner edge is thicker than its outer edge and it has a sloping underside 12' which is adapted to be roughed and cemented. Such roughing operation, may be carried out while the welt is in the condition shown in Fig. 6, or it may be effected later at any convenient time prior to the cementing operation.

The welt strip is then slit from its thin outer edge nearly but not entirely to its thicker inner edge along a plane parallel with the grain surface 11, thus dividing the strip into an upper grain portion and a lower flesh portion attached to each other at 13. The slit is preferably made at a depth corresponding to one-half the thickness of the thicker inner edge so that the point of attachment 13 is about half way up such edge. The lower flesh portion of the welt strip is wedge-shaped in section and is feathered towards its free edge. This flesh portion, as shown in Fig. 8, is then folded about its attached edge at 13 until the sloping surface 12' faces upwardly in the same direction as the grain surface 11 and in effect forms an inward continuation thereof. When such welt is seated against a flat surface such as the upper side of a flat outsole the cementable surface 12' slopes downwardly and inwardly and forms a convenient seat for accommodating the bottom of a lasted upper.

A shoe utilizing the welt of Fig. 8 is illustrated in Fig. 9 and may be made substantially in the manner described in connection with Fig. 4, except that a round bottom last may be conveniently employed so that the overturned lasting allowance 16 slopes in complementary relation with the surface 12' and affords a more compact fit and permits utilization of a thinner filler 117. It is contemplated that by properly proportioning the parts, this filler may even be eliminated. It will be understood that the proportions shown in the drawing are exaggerated for clearness, and are not necessarily like those of the actual shoe.

Another form of cementable welt is shown in Figs. 10 to 13. Here a welt strip 110, preferably of grain leather stock, is provided. This stock has the thickness of conventional welting, but is approximately twice as wide. It has a grain surface 111 and a flesh surface 112.

As shown in Fig. 11, a section 18 is removed from the inner portion of the grain side leaving a thinner section 19 which has a cut or split upper surface 20 which may readily be prepared for the reception of cement.

The removed section 18, as shown in Fig. 12, is then placed under the thin inward extension 19, preferably with its grain surface 111 facing downwardly and with its cut surface in contact with the flesh surface 112 of the main portion of the welt. These contacting surfaces may be adhesively attached if desired, or they may simply be pressed into frictional contact in the step about to be described.

The parts of the welt as assembled in Fig. 12 are next squeezed together under considerable pressure by means of opposed rollers or the like so that section 18 is urged forcibly against extended section 19 and distorts the latter upwardly until its uppermost surface 20 is approximately flush with and forms an inward continuation of the original grain surface 111. This cementable surface 20 is or may be roughed and coated with cement. The under side of the welt comprises the original flesh surface 112 and the superposed grain surface 111, so that the welt is reversible and may be applied to an outer sole with either side up while still affording the desired grain and adjacent cementable surfaces. The welt shown in Fig. 13 is adapted to be utilized in the construction of a shoe substantially in the manner described in connection with Fig. 4, as will be readily understood.

In the forms shown in Figs. 3 and 8 it will be seen that a welt of full width is provided from stock originally having a grain surface only half as wide as the entire welt. Since it is cheaper to provide narrow bands of relatively thick grain leather than to provide wide grain surfaced bands of less thickness, and since the grain surface is only needed at the outer upper side of the welt where it is exposed to view in the completed shoe, the present invention makes it possible to provide relatively inexpensive grain leather welts for use generally in Goodyear, American or other welt shoes, as well as in the herein particularly described cemented welt shoe. It accordingly is contemplated that the welts and methods claimed herein are applicable with advantage to various shoes exemplified by the kinds mentioned.

It will be seen that a construction and method have been provided which are well suited to fulfill their intended function. Since certain changes in carrying out the above process, and certain modifications in the article which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I desire to secure by Letters Patent is:

1. A method of making welts which comprises providing a welt grain leather strip which is tapered from its inner toward its outer edge, slitting said welt strip from its thinner outer edge toward but not entirely to its thicker inner edge along a plane substantially parallel with the grain surface of said strip to form a tapered bottom portion, and folding said tapered bottom portion along its attached edge until its original bottom side faces in the same direction as the grain side of said strip, thus forming a welt having a grain surfaced outer section of uniform thickness and a cementable surfaced attenuated inner section adapted to underlie the upper of a lasted shoe.

2. A method of making welts which comprises providing a grain leather welt strip having a wedge shaped cross section with its thinner edge along the outer side, slitting said strip from the outer edge toward but not to the inner edge along a plane substantially parallel with the grain surface, and folding the under flesh portion of said strip about its attached inner edge until the original under side faces in the same direction as the grain side.

FRIEDRICH HOLLAND.